(12) United States Patent
Ohno et al.

(10) Patent No.: US 11,130,429 B2
(45) Date of Patent: Sep. 28, 2021

(54) VEHICLE SEAT

(71) Applicants: TOYOTA JIDOSHA KABUSHIKI KAISHA, Toyota (JP); TOYOTA BOSHOKU KABUSHIKI KAISHA, Kariya (JP)

(72) Inventors: Mitsuyoshi Ohno, Miyoshi (JP); Makoto Sekizuka, Toyota (JP); Hiroyuki Suzuki, Toyohashi (JP)

(73) Assignees: TOYOTA JIDOSHA KABUSHIKI KAISHA, Toyota (JP); TOYOTA BOSHOKU KABUSHIKI KAISHA, Kariya (JP)

(*) Notice: Subject to any disclaimer, the term of this patent is extended or adjusted under 35 U.S.C. 154(b) by 189 days.

(21) Appl. No.: 16/527,201

(22) Filed: Jul. 31, 2019

(65) Prior Publication Data

US 2020/0079255 A1 Mar. 12, 2020

(30) Foreign Application Priority Data

Sep. 12, 2018 (JP) .............................. JP2018-170910

(51) Int. Cl.
*B60N 2/427* (2006.01)
*B60N 2/00* (2006.01)
*B60N 2/22* (2006.01)
*B60N 2/06* (2006.01)
*B60R 21/015* (2006.01)
*B60R 21/00* (2006.01)

(52) U.S. Cl.
CPC ......... *B60N 2/42745* (2013.01); *B60N 2/002* (2013.01); *B60N 2/06* (2013.01); *B60N 2/2209* (2013.01); *B60N 2/4279* (2013.01); *B60R 21/01552* (2014.10); *B60R 21/01554* (2014.10); *B60R 21/01538* (2014.10); *B60R 2021/0006* (2013.01)

(58) Field of Classification Search
None
See application file for complete search history.

(56) References Cited

U.S. PATENT DOCUMENTS

2007/0252404 A1* 11/2007 Muck ................. B60N 2/22
                                                        296/65.16
2008/0296876 A1   12/2008 Ideue
2016/0159251 A1    6/2016 Ebina et al.
2017/0217335 A1    8/2017 Tominaga et al.
(Continued)

FOREIGN PATENT DOCUMENTS

JP   2008-290529 A   12/2008
JP   2016-168972 A    9/2016
JP   2017-132383 A    8/2017
(Continued)

*Primary Examiner* — David E Allred
(74) *Attorney, Agent, or Firm* — Oliff PLC (57) ABSTRACT

A vehicle seat includes: a seat main body that includes a seat cushion and a seatback that is connected to a seat rear side end portion of the seat cushion and that is rotatable in a seat front-rear direction with respect to the seat cushion; and a lifter device that moves the seat main body in a seat up-down direction, wherein the seat main body is moved toward a seat upper side by the lifter device in a case in which a reclining angle of the seatback is greater than a predetermined angle and the seat main body is lower than a predetermined height.

8 Claims, 10 Drawing Sheets

(56) References Cited

U.S. PATENT DOCUMENTS

2020/0156518 A1* 5/2020 Svitak .................... B60N 2/501
2020/0282942 A1* 9/2020 Yoshimura ............... B60N 2/22

FOREIGN PATENT DOCUMENTS

| JP | 2017-136898 A | 8/2017 |
|---|---|---|
| JP | 2017-170942 A | 9/2017 |
| WO | 2015/011866 A1 | 1/2015 |

* cited by examiner

VEHICLE SEAT

CROSS-REFERENCE TO RELATED APPLICATION

This application claims priority under 35 USC 119 from Japanese Patent Application No. 2018-170910 filed on Sep. 12, 2018, the disclosure of which is incorporated by reference herein.

BACKGROUND

Technical Field

The present disclosure relates to a vehicle seat.

Related Art

International Publication No. 2015/011866 discloses a driving assist device for a vehicle that has a reclining angle control section that controls the angle of reclining of the driver's seat in order for the reclining angle of the driver's seat to be greater in an automatic driving mode than in a manual driving mode.

Further, Japanese Patent Application Laid-Open (JP-A) No. 2008-290529 discloses, in a vehicle airbag device having a side airbag body and a curtain airbag body, a structure in which the curtain airbag body is made into a shape that the side airbag body can be fit into, in the state in which both of these airbag bodies have expanded. Moreover, JP-A No. 2017-132383 discloses a structure that derives the positional posture of a relaxed position (a comfortable posture) in accordance with the physique of the driver. Still further, JP-A No. 2017-136898 discloses a structure that reclines the seatback and tilts the seat cushion when a vehicle transitions from a manual driving state to an automatic driving state. Further, JP-A No. 2017-170942 discloses a structure that changes the relative displacement amounts of respective portions of a seat, between the time of an automatic driving state and the time of a manual driving state. Moreover, JP-A No. 2016-168972 discloses a structure of transitioning to a relaxed posture in a case in which driving is switched from manual driving to automatic driving.

By the way, it has been thought to, at the time of automatic driving of a vehicle, tilt the seatback further rearward than at the time of driving, so as to set the seatback in a reclined state. In this case, the position of the head portion of the vehicle occupant is positioned further toward the lower side than at the time of driving. Therefore, there is room for improvement from the standpoint of ensuring the ability to protect the head portion of a vehicle occupant by a vehicle occupant protecting device or the like that is for protecting the head portion of a vehicle occupant at the time of a side collision.

SUMMARY

The present disclosure provides a vehicle seat that may ensure the ability to protect the head portion of a vehicle occupant, even when the seatback is in a reclined state.

A first aspect of the present disclosure is a vehicle seat including: a seat main body that includes a seat cushion and a seatback that is connected to a seat rear side end portion of the seat cushion and that is rotatable in a seat front-rear direction with respect to the seat cushion; and a lifter device that moves the seat main body in a seat up-down direction, wherein the seat main body is moved toward a seat upper side by the lifter device in a case in which a reclining angle of the seatback is greater than a predetermined angle and the seat main body is lower than a predetermined height.

In the vehicle seat relating to the first aspect, the seat main body includes the seat cushion and the seatback. The seatback is rotatably connected to the seat rear side end portion of the seat cushion. Further, due to the lifter device being operated, the lifter device moves the seat main body in the seat up-down direction. In a case in which the reclining angle of the seatback is greater than a predetermined angle and the seat main body is lower than a predetermined height, the seat main body is moved toward the seat upper side by the lifter device. Due thereto, for example, at times of automatic driving, even if the seatback is tilted rearward more so than at times of driving and is in a reclined state, the seat main body is moved toward the seat upper side by the lifter device. Further, the position of the head portion of the vehicle occupant is moved toward the seat upper side. As a result, the head portion of the vehicle occupant may be positioned in the protecting range of a protecting device that, at the time of a side collision, expands and protects the head portion of the vehicle occupant.

In a second aspect of the present disclosure, in the first aspect, the reclining angle when the seat main body may be moved toward the seat upper side by the lifter device is greater than a range that is set for times of usual driving.

In the vehicle seat of the second aspect, even in a case in which the reclining angle of the seatback is changed at the time of usual driving, the lifter device is not operated, and the vehicle occupant feeling bothered may be suppressed.

In a third aspect of the present disclosure, in the first aspect or the second aspect, the greater the reclining angle of the seatback, the higher the lifter device makes a height of the seat main body.

In the vehicle seat of the third aspect, the head portion of the vehicle occupant may be positioned at an appropriate position that corresponds to the reclining angle, as compared with a case in which the seat main body is moved (raised) toward the seat upper side all at once to an established height. Note that "the height of the seat main body is changed in accordance with the reclining angle" here is not limited to cases in which the relationship between the reclining angle and the height of the seat main body is linear. This is a concept that broadly includes, for example, structures in which the height of the seat main body becomes higher in steps, accompanying an increase in the reclining angle.

A fourth aspect of the present disclosure, in any one of the first through third aspects, the vehicle seat may further include a vehicle occupant detection sensor that detects or infers a height of a head portion of a vehicle occupant seated in the seat main body, wherein, in a case in which the height of the head portion of the vehicle occupant that is detected or inferred by the vehicle occupant detection sensor, with respect to the seat main body, is lower than a predetermined height, a threshold value of a reclining angle for a time of operating the lifter device is made to be smaller than in a case in which the height of the head portion is higher than the predetermined height.

In the vehicle seat of the fourth aspect, in a case in which a vehicle occupant, at which the height of the head portion is low such as a vehicle occupant of a small physique, is seated, the seat main body is raised by the lifter device even in cases in which the reclining angle is relatively small. Due thereto, even in cases in which a vehicle occupant of a small physique is seated, the head portion of the vehicle occupant coming-out from the protecting range of the vehicle occupant protecting device or the like at the time of a side collision may be suppressed, and the performance of protecting the head portion may be ensured.

In a fifth aspect of the present disclosure, in any one of the first through fourth aspects, in a case in which the reclining angle of the seatback is greater than the predetermined angle, the lifter device may make the seat main body able to move further upward than in a case in which the reclining angle of the seatback is smaller than the predetermined angle.

In the vehicle seat of the fifth aspect, the range of movement by the lifter device is extended toward the upper side in a case in which the reclining angle is greater than a predetermined angle. Due thereto, the head portion of the vehicle occupant may be moved toward the seat upper side in a case in which the reclining angle is large, while the seat main body being moved too much toward the seat upper side at times of usual use, such as at times of driving or the like, is suppressed.

In a sixth aspect of the present disclosure, in any one of the first through fifth aspects, the seat main body may be moved toward a seat lower side by the lifter device in a case in which the reclining angle of the seatback is smaller than the predetermined angle and the seat main body is higher than the predetermined height.

In the vehicle seat of the sixth aspect, in a case in which the seatback is set upright from a reclined state, the seat main body may be smoothly moved to a position for the time of driving, due to the seat main body moving toward the seat lower side (being lowered).

As described above, in accordance with the vehicle seat of the present disclosure, the performance of protecting the head portion of a vehicle occupant may be ensured even if the seatback is in a reclined state.

BRIEF DESCRIPTION OF THE DRAWINGS

Exemplary embodiments of the present disclosure will be described in detail based on the following figures, wherein.

DETAILED DESCRIPTION

First Exemplary Embodiment

A vehicle seat 10 relating to a first exemplary embodiment is described with reference to the drawings. Note that arrow FR and arrow UP that are illustrated appropriately in the respective drawings respectively indicate the frontward direction and the upward direction of a seat. Hereinafter, when description is given merely by using front-rear, up-down, and left-right directions, they refer to the front and the rear of the seat front-rear direction, upward and downward in the seat up-down direction, and the left and the right when facing in the seat frontward direction, unless otherwise specified.

Figure 1:
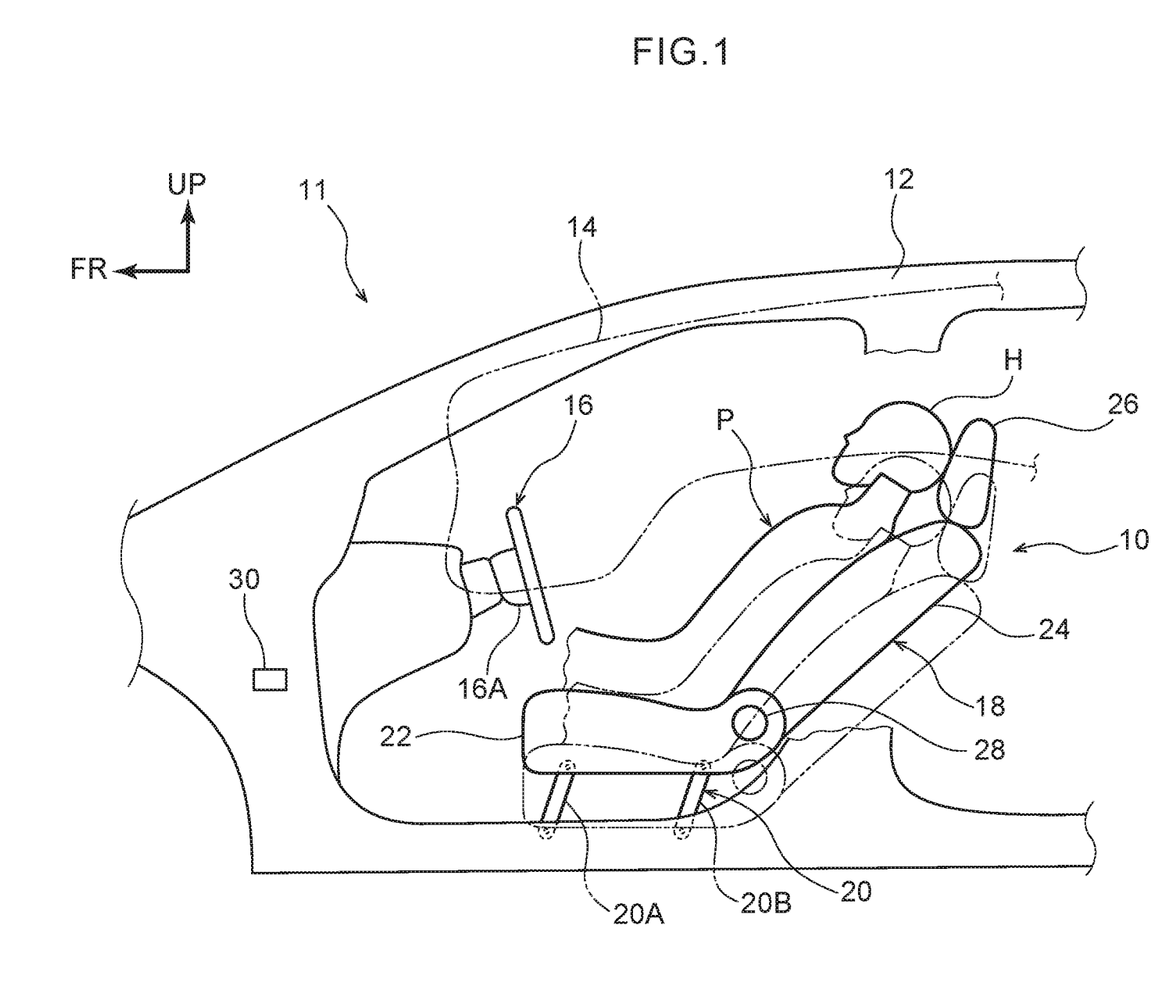
FIG. 1 is a schematic drawing that schematically illustrates the main portions of a vehicle that has a vehicle seat relating to a first exemplary embodiment.

As illustrated in FIG. 1, the vehicle seat 10 is provided at the driver's seat of a vehicle 11 of the present embodiment. Roof side rails 12 extend along the vehicle front-rear direction at the upper portion of the vehicle 11.

A curtain airbag 14 is accommodated at the vehicle transverse direction inner side of the roof side rail 12. Due to gas being supplied from an unillustrated inflator at the time of a side collision of the vehicle 11, the curtain airbag 14 is expanded in the shape of a curtain between a vehicle occupant P and a vehicle side portion, and protects a head portion H of the vehicle occupant P. Note that the curtain airbag 14 that is in an expanded state is illustrated by the two-dot chain line in FIG. 1.

A steering wheel 16 is provided at the vehicle front side of the vehicle seat 10. An unillustrated airbag for the driver's seat is housed within a center pad portion 16A that is at the central portion of the steering wheel 16. Due to gas being supplied from an unillustrated inflator at the time of a front collision of the vehicle 11, the airbag for the driver's seat is inflated and expanded toward the vehicle seat 10, and restrains the vehicle occupant P who moves inertially toward the vehicle front side.

The vehicle seat 10 relating to the present embodiment is described next. The vehicle seat 10 mainly has a seat main body 18 and a lifter device 20. The seat main body 18 is structured to include a seat cushion 22 and a seatback 24. Further, in the present embodiment, the seat front side coincides with the vehicle front side, and the seat transverse direction coincides with the vehicle transverse direction.

The seat cushion 22 is structured so as to be able to support the femoral regions and the buttocks of the vehicle occupant P from the seat lower side. The seatback 24 is connected to the seat rear side end portion of the seat cushion 22. The seatback 24 may rotate in the seat front-rear direction with respect to the seat cushion 22. Concretely, a reclining mechanism 28 is provided at the connected portion of the seat cushion 22 and the seatback 24. The seatback 24 is rotated (reclined) with respect to the seat cushion 22 by the reclining mechanism 28. Further, a headrest 26, which may support the head portion H of the vehicle occupant P from the seat rear side, is provided at the upper end portion of the seatback 24.

The lifter device 20 has front side links 20A and rear side links 20B. The lower end portions of the front side links 20A are rotatably mounted to the vehicle body side, and the upper end portions are rotatably mounted to the front side of the frame of the seat cushion 22. On the other hand, the rear side links 20B are positioned further toward the seat rear side than the front side links 20A. The lower end portions of the rear side links 20B are rotatably mounted to the vehicle body side. The upper end portions of the rear side links 20B are rotatably mounted to the rear side of the frame of the seat cushion 22. Note that, in the present embodiment, the front side links 20A and the rear side links 20B are respectively provided as left-right pairs. The seat main body 18 may be moved in the seat up-down direction by these four links. Further, the rear side links 20B are connected to a driving section such as a motor or the like via unillustrated lifter gears. Due to the driving section driving, the rear side links 20B rotate via the lifter gears, and the seat main body 18 is moved up and down.

Here, an ECU (Electronic Control Unit) 30 that is a control section is provided at the vehicle 11. The vehicle seat 10 is electrically connected to the ECU 30.

Figure 4:
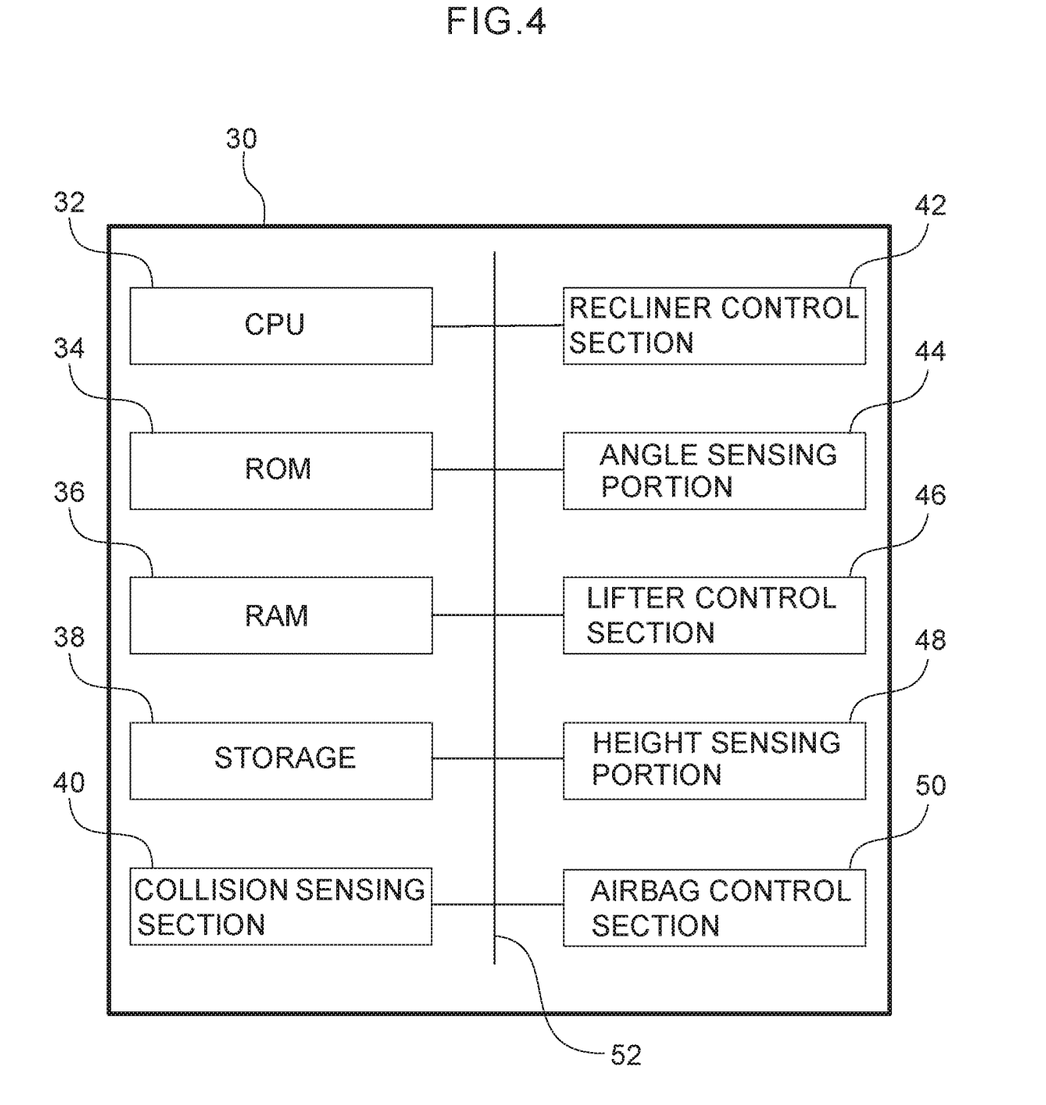
FIG. 4 is a block diagram illustrating the hardware structures of an ECU.

As illustrated in FIG. 4, the ECU 30 is structured so as to mainly include a CPU (Central Processing Unit: processor) 32, a ROM (Read Only Memory) 34, a RAM (Random Access Memory) 36, a storage 38, a collision sensing section 40, a recliner control section 42, an angle sensing portion 44, a lifter control section 46, a height sensing portion 48 and an airbag control section 50. These respective structures are connected via a bus 52 so as to be able to communicate with one another.

The CPU 32 is a central computing processing unit, and executes various types of programs and controls the respective sections. Namely, the CPU 32 reads-out a program from the ROM 34 or the storage 38, and executes the program by using the RAM 36 as a work space. The CPU 32 carries out control of the above-described respective structures and various types of computing processings in accordance with programs that are recorded in the ROM 34 and the storage 38.

The ROM 34 stores various types of programs and various types of data. The RAM 36 temporarily stores programs or data as a work space. The storage 38 is structured by an HDD (Hard Disk Drive) or an SSD (Solid State Drive), and various types of programs including the operating system, and various types of data are stored therein.

The collision sensing section 40 senses or predicts a collision of the vehicle 11. Concretely, the collision sensing section 40 receives signals from plural sensors that are provided at the vehicle 11, and senses or predicts that the vehicle 11 is or will be involved in a collision. At this time, determination is carried out also with respect to the form of the collision of the vehicle 11, such as whether the form of the collision is a front collision or is a side collision, or the like.

The recliner control section 42 controls the reclining mechanism 28 of the vehicle seat 10, and senses operations of levers or buttons or the like by the vehicle occupant P, and changes the reclining angle of the seatback 24. Further, the angle sensing portion 44 senses the reclining angle of the seatback 24.

The lifter control section 46 controls the lifter device 20, and senses operations of levers or buttons or the like by the vehicle occupant P, and changes the height of the seat main body 18. Further, the height sensing portion 48 senses the height of the seat main body 18 with respect to a reference.

The airbag control section 50 controls the respective airbag devices that are installed in the vehicle 11, and inflates and expands the airbags that correspond to the form of the collision that is sensed or predicted by the collision sensing section 40. Concretely, the airbag control section 50 causes gas to be generated by operating inflators of airbag devices, and inflates and expands airbags by supplying the gas to the airbags.

Further, in the present embodiment, the ECU 30 is structured so as to move the seat main body 18 toward the seat upper side by the lifter device 20 in a case in which the reclining angle of the seatback 24 is greater than a predetermined angle and the seat main body 18 is lower than a predetermined height. The flow of this seat raising processing is described with reference to FIG. 2, the graph of FIG. 3 and the flowchart of FIG. 5. Note that, in the following explanation, among the angles that are formed by the seat cushion 22 and the seatback 24 such as θ1 and θ2 of FIG. 2, the angle at which the seatback 24 is inclined rearward with respect to the vertical direction is the "reclining angle".

Figure 5:
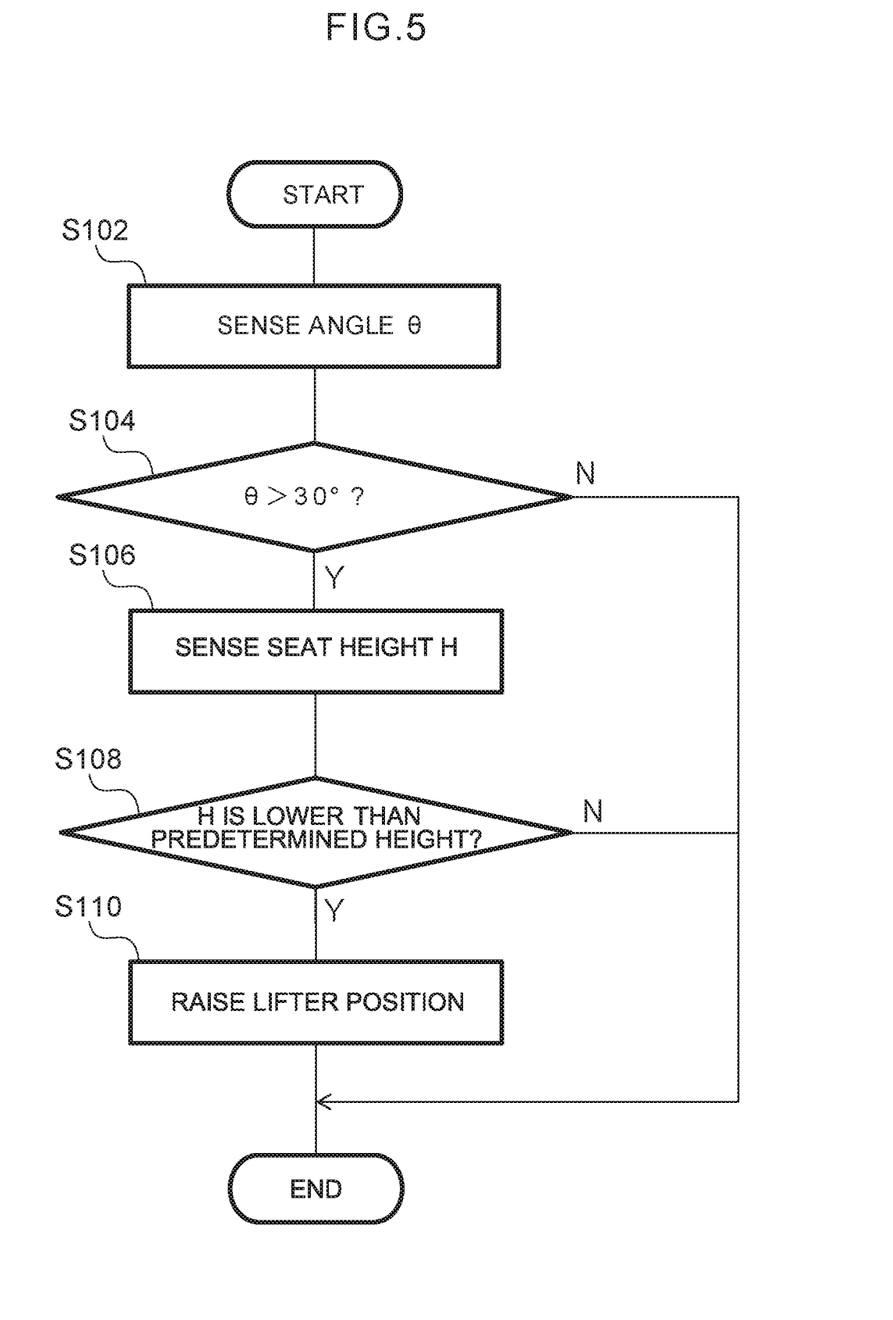
FIG. 5 is a flowchart illustrating the flow of seat raising processings relating to the first exemplary embodiment.

In step S102 of FIG. 5, the CPU 32 senses reclining angle θ of the seatback 24 by the angle sensing portion 44 (see FIG. 4). Next, in step S104, the CPU 32 judges whether or not the sensed reclining angle θ of the seatback 24 is greater than 30°.

Figure 3:
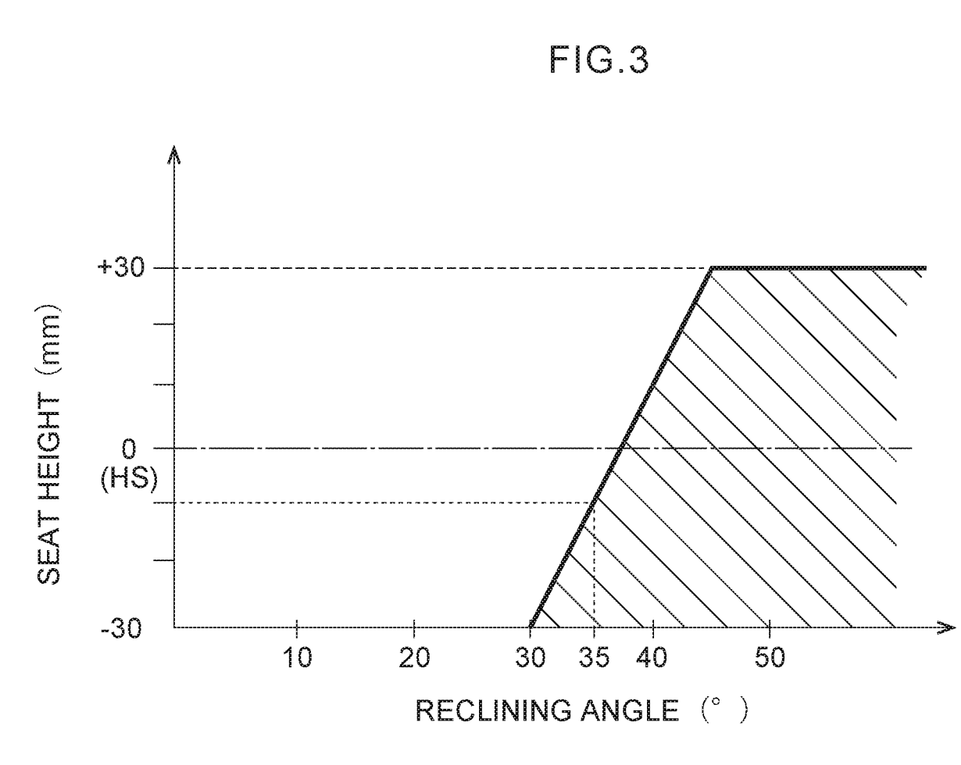
FIG. 3 is graph illustrating the relationship between a reclining angle of the seatback and seat height relating to the first exemplary embodiment.

Here, in the present embodiment, the relationship between the reclining angle of the seatback 24 and the height of the seat main body 18 is set on the basis of the graph of FIG. 3, and control is carried out such that this relationship does not enter into the hatched region. Further, the threshold value of the reclining angle at which control of the lifter device 20 is carried out is made to be 30°. Therefore, in the present embodiment, as described above, in step S104 of FIG. 5, the CPU 32 judges whether or not the reclining angle θ of the seatback 24 is greater than 30° which is the threshold value. If the reclining angle θ of the seatback 24 is greater than 30°, the CPU 32 moves onto the processing of step S106, whereas, if the reclining angle θ of the seatback 24 is 30° or less, the CPU 32 ends the processing.

Figure 2A:
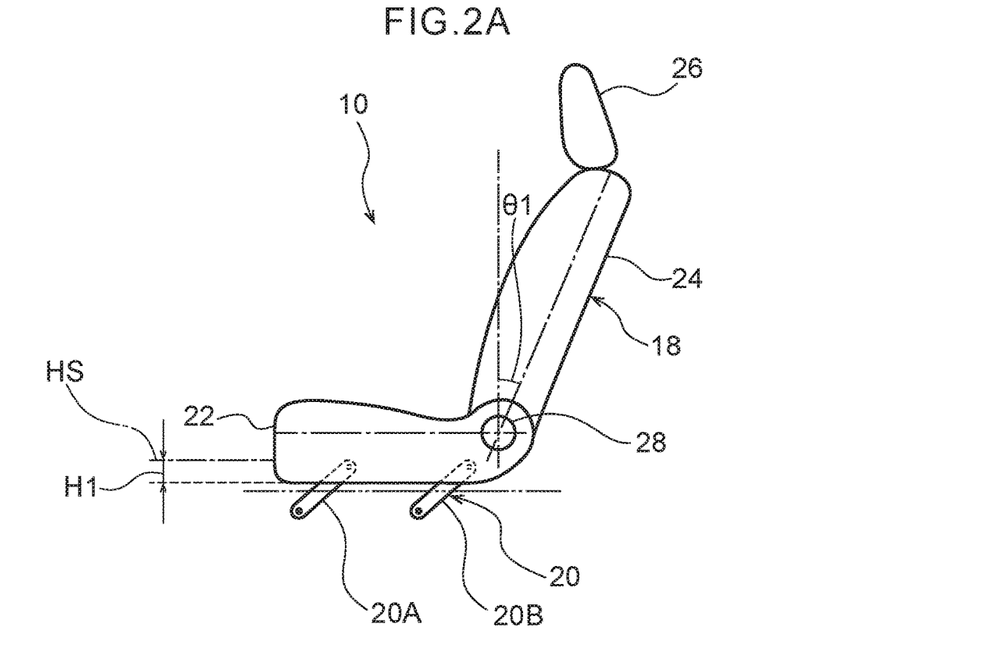
FIG. 2A is a side view of the vehicle seat in a state before a lifter device operates.

In FIG. 2A, the reclining angle θ1 of the seatback 24 is set to an angle between 20° and 30°. This is a reclining angle of a range that is set for the times of usual driving. In such a case, in step S104 of FIG. 5, the reclining angle θ1 of the seatback 24 is less than or equal to 30°, and therefore, processing ends. Namely, the lifter device 20 is not operated.

Figure 2B:
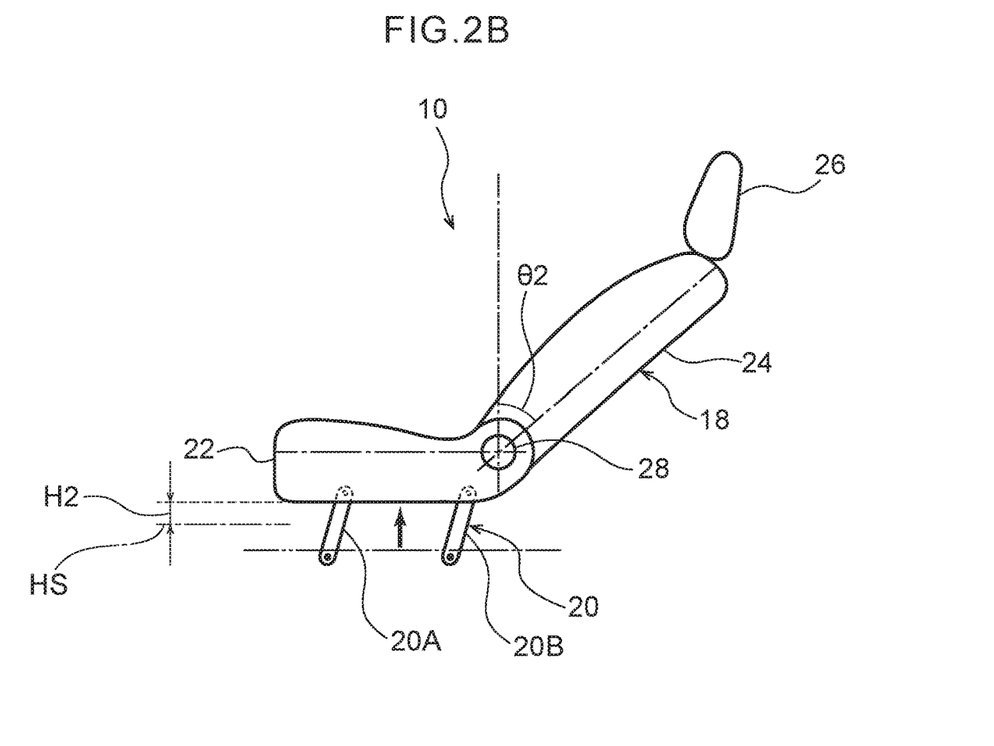
FIG. 2B is a side view of the vehicle seat in a state in which a seatback is reclined and the lifter device has operated.

On the other hand, as illustrated in FIG. 2B, in a case in which the reclining angle θ2 is greater than 30°, the CPU 32 moves onto the processing of step S106. In step S106, the CPU 32 senses seat height H of the seat main body 18 by the height sensing portion 48. As illustrated in FIG. 3, as an example, for the seat height, reference height HS is set to 0 mm. In cases in which the seat height is greater than the reference height HS, the seat height is a positive value, and, in cases in which the seat height is lower than the reference height HS, the seat height is a negative value. Further, in the present embodiment, the seat height may be moved in a range of from −30 mm (the lowermost position) to +30 mm (the uppermost position).

In step S108 of FIG. 5, the CPU 32 judges whether or not the sensed seat height H is lower than a predetermined height. For example, in the graph of FIG. 3, in a case in which the reclining angle is 35°, if the seat height is lower than −10 mm, the relationship falls into the hatched region. Therefore, in step S108, in a case in which the reclining angle of the seatback 24 is 35°, the CPU 32 judges whether or not the seat height H is lower than −10 mm. If the seat height H is lower than −10 mm, the CPU 32 moves on to step S110, and, if the seat H is greater than or equal to −10 mm, the CPU 32 ends the processing. Note that a case in which the reclining angle is 35° is explained as an example here, but, if the reclining angle is different, the predetermined height in step S108 is changed on the basis of the graph of FIG. 3.

In step S110 of FIG. 5, the CPU 32 operates the lifter device 20 and raises the lifter position. Namely, the height of the seat main body 18 is raised.

Here, a case in which the seatback 24 is tilted rearward from the state of FIG. 2A to the state of FIG. 3B is described. In FIG. 2A, the reclining angle θ1 of the seatback 24 is smaller than the 30° which is the threshold value as described above. Further, height H1 of the seat main body 18 is positioned lower than the reference height HS, and therefore, is a negative value.

When, from this state, the seatback 24 is tilted rearward and becomes the state of FIG. 2B, the reclining angle θ2 becomes an angle between 40° and 50°, and therefore, is greater than or equal to the threshold value of 30°. In this case, the CPU 32 moves from step S104 to step S106 of FIG. 5. Further, if the seatback 24 is merely tilted rearward, the height of the seat main body 28 does not change, and therefore, as illustrated in FIG. 2A, the seat height H1 of the seat main body 18 is a negative value. Therefore, the relationship between the reclining angle and the seat height falls in the hatched region of the graph of FIG. 3. Namely, it is judged that the seat height H1 is lower than the predetermined height, and the seat main body 18 is raised by the lifter device 20. Further, the seat main body 18 is raised to a position where the relationship between the reclining angle and the seat height comes out of the hatched region of FIG. 3, and processing ends. Note that, in FIG. 3, in cases in which the reclining angle is 45° or more, the state in which the seat height is +30 mm (the uppermost position) is maintained.

As described above, in the present embodiment, control is carried out such that, the greater the reclining angle of the seatback 24, the more the height of the seat main body 18 is raised. Further, in the present embodiment, 30° that is the threshold value of the reclining angle is an angle that is greater than the range that is set for times of usual driving. Namely, this is an angle in a case in which the vehicle occupant P is in a comfortable posture, such as at times of automatic driving or the like.

(Operation)

Operation of the present exemplary embodiment is described next.

At the vehicle seat 10 of the present embodiment, the seat main body 18 may be moved toward the seat upper side by the lifter device 20 in a case in which the reclining angle of the seatback 24 is greater than a predetermined angle and the seat main body 18 is lower than a predetermined height.

Here, for example, as illustrated by the two-dot chain line in FIG. 1, at times of automatic driving, in a case in which the seatback 24 is tilted rearward more than at times of manual driving and is in a reclined state, it is supposed that, if the lifter device 20 is not operated, the height of the head portion H of the vehicle occupant P will be outside of the range of protection of the curtain airbag 14. In the present embodiment, as illustrated by the solid line in FIG. 1, the lifter device 20 is operated, the seat main body 18 is moved toward the seat upper side, and the position of the head portion H of the vehicle occupant P is moved toward the seat upper side. As a result, the head portion H of the vehicle occupant P may be positioned in the protecting range of the curtain airbag 14. Namely, the performance of protecting the head portion H of the vehicle occupant P may be ensured even in a reclined state.

Further, in the present embodiment, the threshold value of the reclining angle at which the lifter device 20 is operated is set to be an angle that is greater than an angle at the time of usual driving, and that is an angle that is of a relaxed posture. Due thereto, even in a case in which, at the time of usual driving, the reclining angle of the seatback 24 is changed, the lifter device 20 does not operate, and the vehicle occupant P feeling bothered may be suppressed.

Moreover, in the present embodiment, by changing the height of the seat main body 18 in accordance with the reclining angle of the seatback 24, the head portion H of the vehicle occupant P may be positioned at an appropriate height that corresponds to the reclining angle, as compared with a case in which the seat main body 18 is raised all at once to an established height. Namely, as illustrated by the graph of FIG. 3, in the present embodiment, the relationship between the reclining angle and the height of the seat main body 18 is set such that, the greater the reclining angle of the seatback 24, the higher the needed seat height. Therefore, the seat main body 18 may be raised gradually as the seatback 24 is tilted rearward.

Note that, in the present embodiment, the seat height may move in a range of from −30 mm to +30 mm. However, the present disclosure is not limited to this, and, for example, control may be carried out as in the graph of the modified example illustrated in FIG. 6.

(Modified Example)

Figure 6:
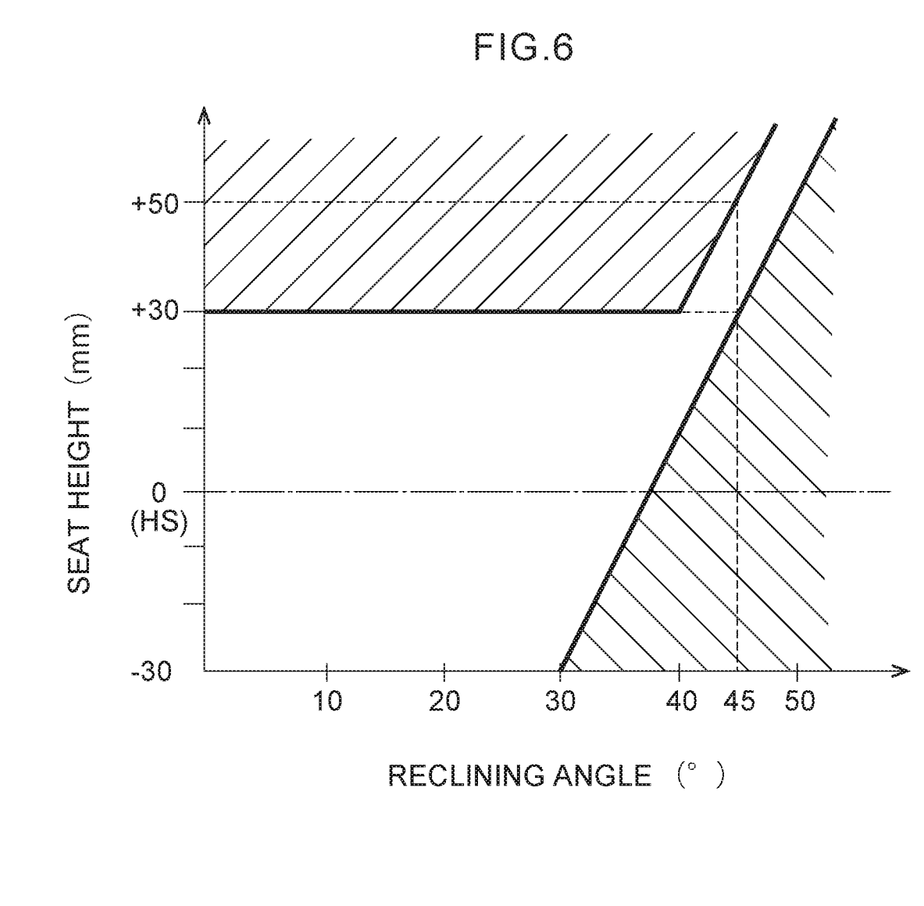
FIG. 6 is a graph illustrating the relationship between the reclining angle of the seatback and the seat height relating to a modified example of the first exemplary embodiment.

As illustrated in FIG. 6, the present modified example is structured such that, under a predetermined condition, the seat height of the seat main body 18 may be moved to a position higher than +30 mm.

Concretely, at times of usual driving, the lifter device 20 is locked such that the seat main body 18 cannot move to a position that is higher than +30 mm. In a case in which the reclining angle of the seatback 24 is greater than 40°, the locked state of the lifter device 20 is cancelled, and the seat main body 18 is made able to move further upward. Namely, the lifter device 20 is structured such that the seat main body 18 may be moved to a position higher than +30 mm only in cases in which the reclining angle is greater than 40°.

Further, in the present modified example, in cases in which the reclining angle is smaller than a predetermined angle and the seat main body 18 is higher than a predetermined height, the seat main body 18 is moved toward the seat lower side by the lifter device 20. The flow of this seat lowering processing is described with reference to the flowchart of FIG. 7.

Figure 7:
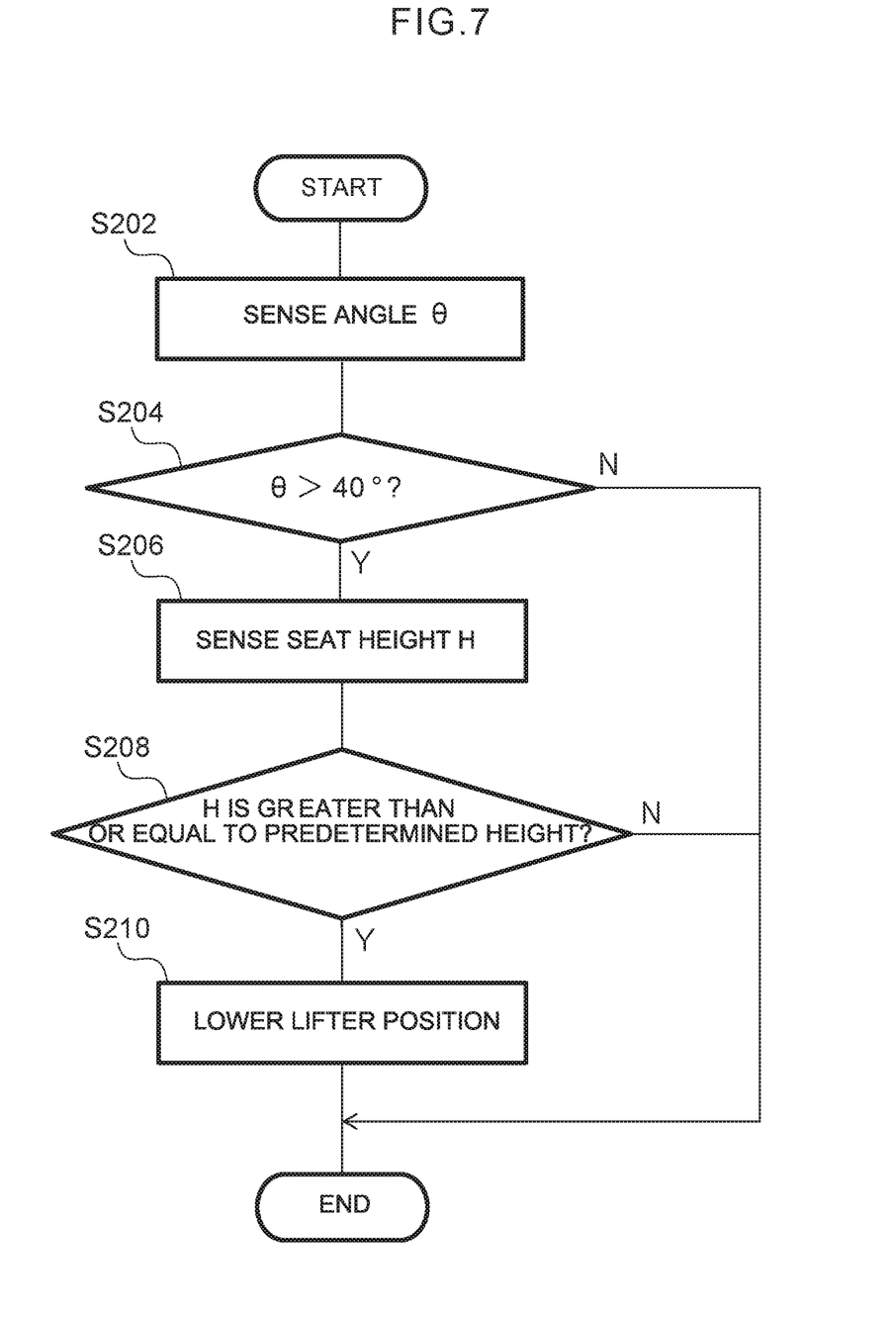
FIG. 7 is a flowchart illustrating the flow of seat lowering processings relating to the modified example.

In step S202 of FIG. 7, the CPU 32 senses the reclining angle θ of the seatback 24 by the angle sensing portion 44 (see FIG. 4). Next, in step S204, the CPU 32 judges whether or not the sensed reclining angle θ of the seatback 24 is greater than 40°. If the reclining angle θ of the seatback 24 is greater than 40°, the CPU 32 moves on to step S206. If the reclining angle θ of the seatback 24 is 40° or less, the CPU 32 ends the processing.

In step S206, the CPU 32 senses the seat height H of the seat main body 18. Then, in step S208, the CPU 32 judges whether or not the sensed seat height H is greater than or equal to a predetermined height. For example, in the graph of FIG. 6, in a case in which the reclining angle is 45°, the seat height is set to a range of from +30 mm to +50 mm. Therefore, in step S208, if the reclining angle of the seatback 24 is 45°, the CPU 32 judges whether or not the seat height H is greater than or equal to +50 mm. If the seat height is +50 mm or greater, the CPU moves on to step S210. If the seat height H is lower than +50 mm, the CPU 32 ends the processing.

In step S210, the CPU 32 operates the lifter device 20 and lowers the lifter position. Namely, the height of the seat main body 18 is lowered.

By lowering the height of the seat main body 18 as described above, in a case in which the seatback 24 is set upright from a reclined state, the seat main body 18 is moving toward the seat lower side, and therefore, may be smoothly moved to a position for the time of driving.

Further, in a case in which the reclining angle is in the range that is set for usual driving, the seat height becoming higher than +30 mm may be suppressed.

Second Exemplary Embodiment

A vehicle seat 60 relating to a second exemplary embodiment is described next. Note that structures that are similar to those of the first embodiment are denoted by the same reference numerals, and description thereof is omitted as appropriate.

Figure 8:
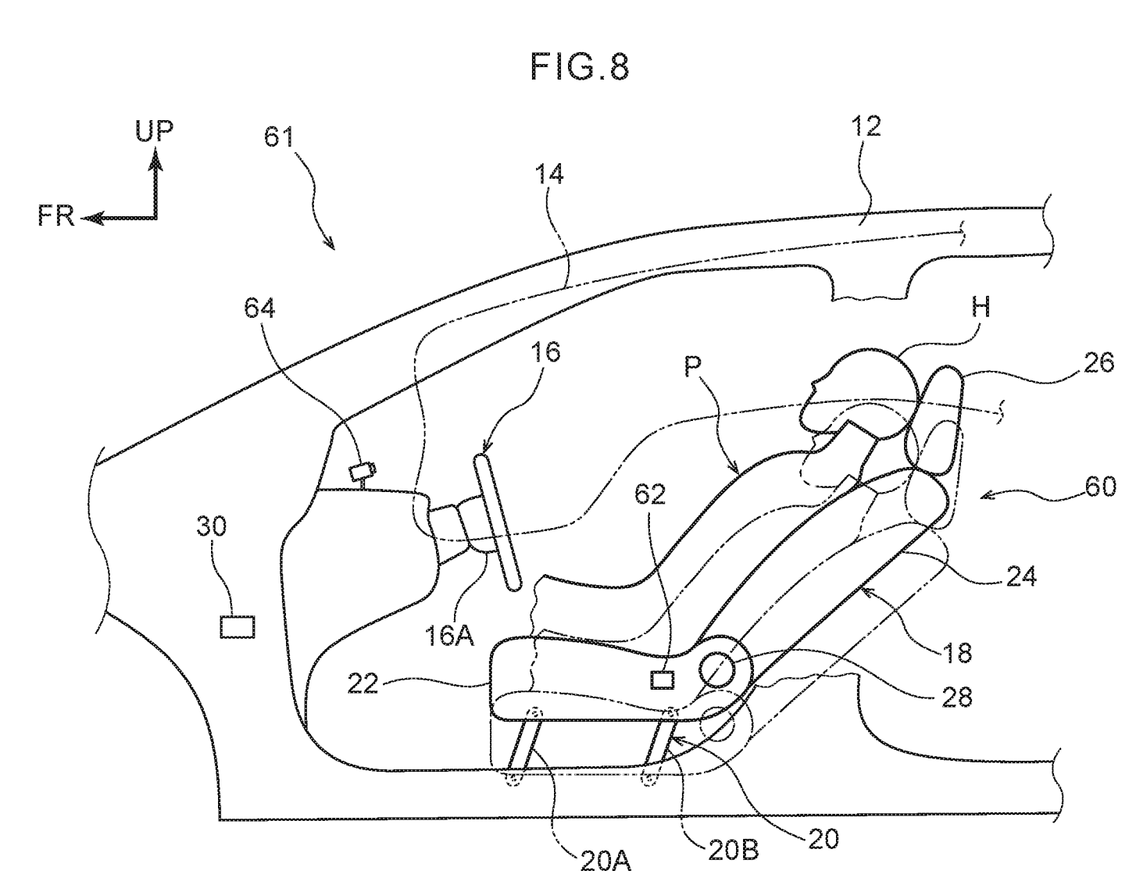
FIG. 8 is a schematic drawing that schematically illustrates the main portions of a vehicle that has a vehicle seat relating to a second exemplary embodiment.

As illustrated in FIG. 8, the vehicle seat 60 is provided at the driver's seat of a vehicle 61 of the present embodiment. The vehicle seat 60 mainly has the seat main body 18 and the lifter device 20. The seat main body 18 is structured by the seat cushion 22 and the seatback 24. Further, in the present embodiment, the seat front side coincides with the vehicle front side, and the seat transverse direction coincides with the vehicle transverse direction.

The seat cushion 22 is structured so as to be able to support the femoral regions and the buttocks of the vehicle occupant P from the seat lower side. The seatback 24 is connected to the seat rear side end portion of the seat cushion 22. Further, a weight sensor 62, which serves as a vehicle occupant sensing sensor and that may sense the body weight of the vehicle occupant P who is seated in the vehicle seat 60, is provided at the interior of the seat cushion 22.

Further, an optical camera 64 that serves as a vehicle occupant sensing sensor is provided further toward the vehicle front side than the steering wheel 16 of the vehicle 61. Images of the vehicle cabin interior, including the vehicle seat 60, may be captured by this optical camera 64. The weight sensor 62 and the optical camera 64 are electrically connected to the ECU 30. In the same way as in the first embodiment, the ECU 30 has the structure illustrated in FIG. 4.

Here, in the present embodiment, the CPU 32 senses or infers the height of the head portion H of the vehicle occupant P seated in the vehicle seat 60, with respect to the seat main body 18, by at least one of the weight sensor 62 and the optical camera 64. Then, in accordance with the sensed or inferred height of the head portion H of the vehicle occupant P, the CPU 32 changes the threshold value of the reclining angle of the seatback 24 for the time of moving the lifter device 20. The flow of the threshold value changing processings is described with reference to the graph of FIG. 9 and the flowchart of FIG. 10. Note that the threshold value of the reclining angle before being changed is 30°.

Figure 10:
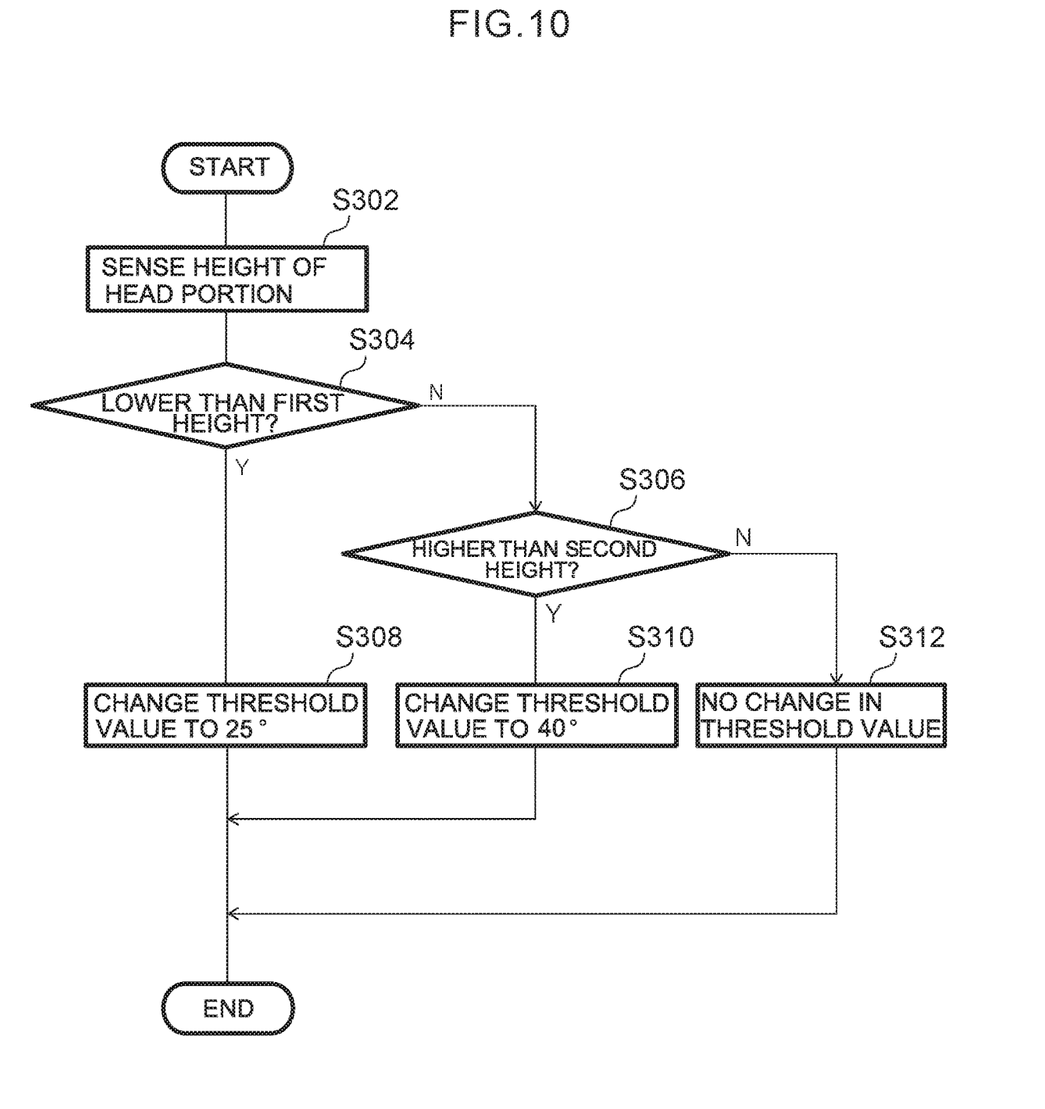
FIG. 10 is a flowchart illustrating the flow of threshold value changing processings relating to the second exemplary embodiment.

In step S302 of FIG. 10, the CPU 32 senses the height of the head portion H of the vehicle occupant P. Note that, here, the height of the head portion H with respect to a reference height is sensed by the optical camera 64, and the weight sensor 62 is used additionally in order to infer the height of the head portion H. Namely, the height of the head portion H of the vehicle occupant P is inferred from the body weight of the vehicle occupant P that is sensed by the weight sensor 62.

In step S304, the CPU 32 judges whether or not the height of the head portion H of the vehicle occupant P is lower than a predetermined first height. The first height is a value that is set in advance, and is a threshold value for judging whether or not the vehicle occupant who is seated in the vehicle seat 60 is of a small physique. If the height of the head portion H is lower than the first height, the CPU 32 moves on to step S308. On the other hand, if the height of the head portion H is greater than or equal to the first height, the CPU 32 moves on to step S306.

In the case of moving on to step S308, the CPU 32 judges that the vehicle occupant P is of a small physique, and changes the threshold value of the reclining angle of the seatback 24 for the time of operating the lifter device 20 to 25°. Then, the CPU 32 ends the processing.

Figure 9A:
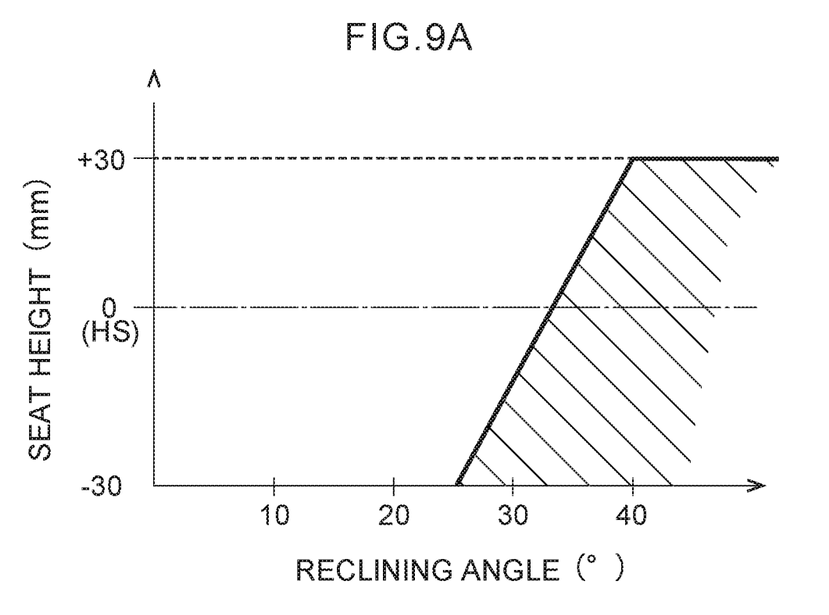
FIG. 9A is a graph illustrating the relationship between the reclining angle of the seatback and the seat height in the case of a vehicle occupant of a small physique.

As illustrated in FIG. 9A, in a case in which the threshold value is changed to 25°, control is carried out such that, as compared with a case in which the threshold value is 30°, the seat height is raised even at the same reclining angle. Namely, in a case in which the threshold value is 30°, as illustrated in FIG. 3, the seat height becomes +30 mm at the time when the reclining angle is 45°. In contrast, in a case in which the threshold value is 25°, as illustrated in FIG. 9A, the seat height becomes +30 mm when the reclining angle is 40°.

In step S306 of FIG. 10, the CPU 32 judges whether or not the height of the head portion H of the vehicle occupant P is higher than a predetermined second height. The second height is a preset value, and is a value that is higher than the first height. Further, the second height is a threshold value for judging whether or not the vehicle occupant who is seated in the vehicle seat 60 is of a large physique. If the height of the head portion H is greater than the second height, the CPU 32 moves on to step S310. On the other hand, if the height of the head portion H is less than or equal to the second height, the CPU 32 moves on to step S312.

In the case of moving on to step S310, the CPU 32 judges that the vehicle occupant P is of a large physique, and changes the threshold value of the reclining angle of the seatback 24 for the time of operating the lifter device 20 to 40°. Then, the CPU 32 ends the processing.

Figure 9B:
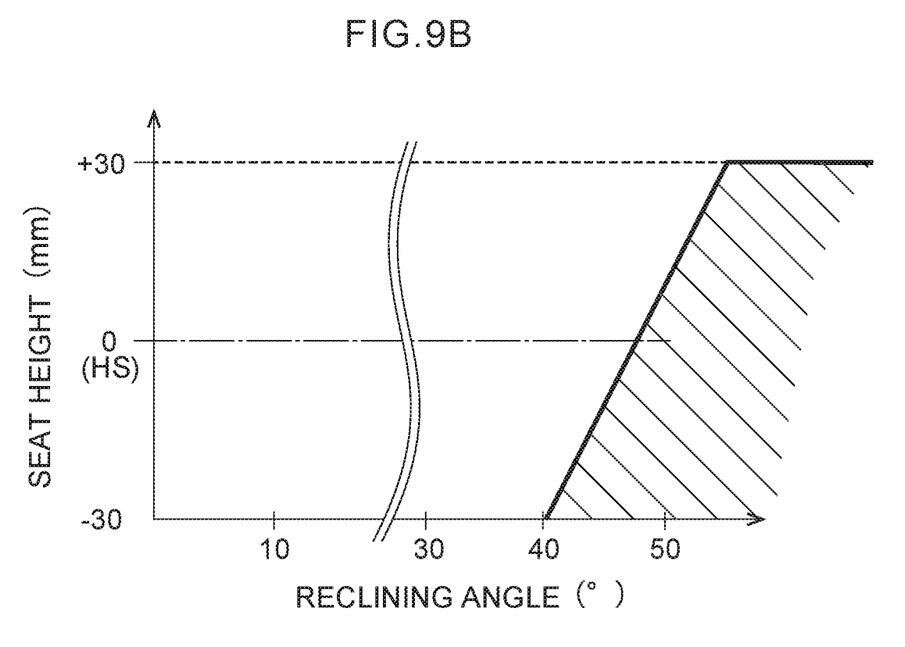
FIG. 9B is a graph illustrating the relationship between the reclining angle of the seatback and the seat height in the case of a vehicle occupant of a large physique.

As illustrated in FIG. 9B, in a case in which the threshold value is changed to 40°, control is carried out such that, as compared with a case in which the threshold value is 30°, the seat height is lowered even at the same reclining angle. Namely, in a case in the seat height is −30 mm, the lifter device 20 is not operated until the reclining angle becomes 40°.

In step S312 of FIG. 10, because the height of the head portion H of the vehicle occupant P is a height between the first height and the second height, the threshold value of the reclining angle is not changed. Namely, the threshold value is maintained at 30°.

As described above, in the present embodiment, in a case in which the sensed or inferred height of the head portion H of the vehicle occupant P with respect to the seat main body 18 is lower than the predetermined first height, the threshold value of the reclining angle for the time of operating the lifter device 20 is made to be small as compared with a case in which the height of the head portion H is greater than the first height. Further, in a case in which the sensed or inferred height of the head portion H of the vehicle occupant P with respect to the seat main body 18 is greater than the predetermined second height, the threshold value of the reclining angle for the time of operating the lifter device 20 is made to be large as compared with a case in which the height of the head portion H is lower than the second height.

(Operation)

Operation of the present exemplary embodiment is described next.

At the vehicle seat 60 of the present embodiment, in a case in which the vehicle occupant P whose height of the head portion H is low is seated such as a vehicle occupant having a small physique, even if the reclining angle is relatively small, the seat main body 18 is raised by the lifter device 20. Due thereto, even in cases in which the vehicle occupant P of a small physique is seated, at the time of a side collision, the head portion H of the vehicle occupant P coming out of the protecting range of the vehicle occupant protecting device such as the curtain airbag 14 or the like may be suppressed, and the performance of protecting the head portion H may be ensured.

Although a first embodiment and a second embodiment have been described above, the present disclosure may, of course, be implemented in various forms within a scope that does not depart from the gist thereof. For example, in the above-described embodiments, as illustrated in FIG. 3, the relationship between the reclining angle and the height of the seat main body 18 is linear when the reclining angle is between 30° and 45°, but the present disclosure is not limited to this. Concretely, the height of the seat main body 18 may become greater in steps, accompanying an increase in the reclining angle. In this case, the seat height is raised in steps as the reclining angle becomes larger. For example, control may be carried out such that the seat height is raised by 10 mm when the reclining angle becomes 2.5° larger. In this case as well, the height of the seat main body 18 is changed in accordance with the reclining angle.

Further, as illustrated in FIG. 1 and FIG. 8, the above-described embodiments describe structures that are provided with the curtain airbag 14 as the protecting device that protects the head portion H of the vehicle occupant P at the time of a side collision. However, the present disclosure is not limited to this. For example, the present disclosure may be applied to a vehicle that is provided with a protecting device that protects the head portion H of the vehicle occupant P by inflating and expanding toward the vehicle occupant P from the vehicle body side, such as from a door trim or a pillar garnish or the like.

Moreover, in the above-described embodiments, the threshold value of the reclining angle for the time of operating the lifter device 20 is 30°. However, the present disclosure is not limited to this, and another threshold value may be set.

Still further, the second embodiment is structured such that the threshold value of the reclining angle is changed to 25°, 30° and 40° in accordance with the height of the head portion H of the vehicle occupant P. However, the present disclosure is not limited to this, and, for example, the threshold value may be set to another angle. Further, there may be a structure in which the threshold value is set to either 25° or 30°.

Further, the second embodiment describes a structure in which, as illustrated in FIG. 8, the weight sensor 62 and the optical camera 64 are provided as the vehicle occupant sensing sensors for sensing or inferring the height of the head portion H of the vehicle occupant P. However, the present disclosure is not limited to this. For example, the height of the head portion H may be inferred by inferring the physique of the vehicle occupant P from the set value of a seat sliding sensor or the like that is provided at the vehicle seat 60. Namely, it may be assumed that the greater the amount that the vehicle seat 60 is slid toward the vehicle rear side, the larger the physique of the vehicle occupant P.

Further, conversely, it may be assumed that the smaller the amount that the vehicle seat 60 is slid toward the vehicle rear side, the smaller the physique of the vehicle occupant P. Further, a pressure sensor may be built into the headrest 26, and the height of the head portion H may be sensed or inferred due to load being inputted from the head portion H of the vehicle occupant P to the pressure sensor.

Moreover, in the above-described embodiments, the lifter device 20 is controlled by the ECU 30 that is provided at the vehicle 11 or the vehicle 61. However, the present disclosure is not limited to this. For example, there may be a structure in which a control device is provided separately at the interior of the vehicle seat 10 or the vehicle seat 60, and the lifter device 20 is operated by this control device.

What is claimed is:

1. A vehicle seat comprising:
    a seat main body that includes a seat cushion and a seatback that is connected to a seat rear side end portion of the seat cushion and that is rotatable in a seat front-rear direction with respect to the seat cushion; and
    a lifter device that moves the seat main body in a seat up-down direction,
    wherein the seat main body is moved toward a seat upper side by the lifter device in a case in which a reclining angle of the seatback is greater than a predetermined angle and the seat main body is lower than a predetermined height.

2. The vehicle seat of claim 1, wherein the reclining angle when the seat main body is moved toward the seat upper side by the lifter device is greater than a range that is set for times of usual driving.

3. The vehicle seat of claim 1, wherein the greater the reclining angle of the seatback, the higher the lifter device makes a height of the seat main body.

4. The vehicle seat of claim 1, further comprising a vehicle occupant detection sensor that detects or infers a height of a head portion of a vehicle occupant seated in the seat main body,
    wherein, in a case in which the height of the head portion of the vehicle occupant that is detected or inferred by the vehicle occupant detection sensor, with respect to the seat main body, is lower than a predetermined height, a threshold value of a reclining angle for a time of operating the lifter device is made to be smaller than in a case in which the height of the head portion is higher than the predetermined height.

5. The vehicle seat of claim 1, wherein, in a case in which the reclining angle of the seatback is greater than the predetermined angle, the lifter device makes the seat main body able to move further upward than in a case in which the reclining angle of the seatback is smaller than the predetermined angle.

6. The vehicle seat of claim 1, wherein the seat main body is moved toward a seat lower side by the lifter device in a case in which the reclining angle of the seatback is smaller than the predetermined angle and the seat main body is higher than the predetermined height.

7. The vehicle seat of claim 4, wherein:
    the vehicle occupant detection sensor includes a weight sensor that is provided at an interior of the seat cushion and that is configured to detect a body weight of the vehicle occupant seated in the seat main body, and
    the height of the head portion of the vehicle occupant is inferred from the body weight of the vehicle occupant that is detected by the weight sensor.

8. The vehicle seat of claim 4, wherein:
the vehicle occupant detection sensor includes a seat sliding sensor that is configured to detect an amount of sliding of the seat main body toward a vehicle rear side, and
the vehicle occupant detection sensor infers that a physique of the vehicle occupant is small in a case in which the amount of sliding toward the vehicle rear side that is detected by the seat sliding sensor is small.

* * * * *